(12) United States Patent
Meng et al.

(10) Patent No.: US 10,839,518 B2
(45) Date of Patent: Nov. 17, 2020

(54) IMAGE EDGE EXTRACTION METHOD AND DEVICE, AND AUTOMATED DRIVING SYSTEM

(71) Applicant: Beijing Smarter Eye Technology Co. Ltd., Beijing (CN)

(72) Inventors: Ran Meng, Beijing (CN); Feng Cui, Beijing (CN); Haitao Zhu, Beijing (CN); An Jiang, Beijing (CN); Hua Chai, Beijing (CN); Zunying Pang, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 101 days.

(21) Appl. No.: 16/250,789

(22) Filed: Jan. 17, 2019

(65) Prior Publication Data

US 2019/0392585 A1    Dec. 26, 2019

(30) Foreign Application Priority Data

Jun. 26, 2018   (CN) .......................... 2018 1 0668094

(51) Int. Cl.
| | |
|---|---|
| *G06T 7/13* | (2017.01) |
| *G06T 7/136* | (2017.01) |
| *G06T 7/12* | (2017.01) |
| *G05D 1/02* | (2020.01) |

(52) U.S. Cl.
CPC ............. *G06T 7/13* (2017.01); *G05D 1/0246* (2013.01); *G06T 7/12* (2017.01); *G06T 7/136* (2017.01)

(58) Field of Classification Search
CPC .. G06T 7/13; G06T 7/136; G06T 7/12; G05D 1/0246
See application file for complete search history.

(56) References Cited

U.S. PATENT DOCUMENTS

| | | | |
|---|---|---|---|
| 2008/0199082 A1* | 8/2008 | Tanaka ................. | G06K 9/4604 382/199 |
| 2012/0050224 A1* | 3/2012 | Chung .................. | G06F 3/0418 345/175 |
| 2013/0129225 A1* | 5/2013 | Poyil ...................... | G06T 7/181 382/199 |
| 2013/0163869 A1* | 6/2013 | Chang .................. | G06K 9/4604 382/170 |
| 2018/0348249 A1* | 12/2018 | Kawamoto .......... | G01B 11/002 |
| 2019/0302963 A1* | 10/2019 | Harrison ................ | G06F 3/017 |

\* cited by examiner

*Primary Examiner* — Asghar H Bilgrami
(74) *Attorney, Agent, or Firm* — Novick, Kim & Lee, PLLC; Allen Xue (57) ABSTRACT

An image edge extraction device for an automated driving system is capable of extracting an image edge in a rapid manner. The device employs an image edge extraction method that includes: acquiring a grayscale image of a target image; calculating an edge magnitude and an edge angle of the grayscale image, so as to generate an edge magnitude image and an edge angle image; detecting an edge peak of the edge magnitude image in accordance with the edge angle image, so as to acquire each edge point of the edge magnitude image and acquire an edge peak detection result; and performing double-thresholding segmentation on the edge peak detection result through a flooding method, so as to acquire an image edge of the target image.

13 Claims, 10 Drawing Sheets

|   |   |   |
|---|---|---|
| A | B | C |
| D | E | F |
| G | H | J |

FIG. 7

(a) an angle of 0°° and a DN value of 0

(a) an angle of 45°° and a DN value of 32

(a) an angle of 180°° and a DN value of 127

FIG. 8

(a) grayscale image (b) edge magnitude image

FIG. 9

(a) grayscale image     (b) edge angle image

IMAGE EDGE EXTRACTION METHOD AND DEVICE, AND AUTOMATED DRIVING SYSTEM

TECHNICAL FIELD

The present disclosure relates to the field of image processing technology, in particular to an image edge extraction method, an image edge extraction device, and an automated driving system.

BACKGROUND

In the field of image processing technology, an edge matching technique has been widely used, e.g., searching and positioning of a specific image in a target image, and real-time stereo matching between images acquired by left and right cameras of a binocular stereo vision system. As a common and effective method different from a zone matching technique, the edge matching technique is used to measure similarity of two images. As a precondition for the edge matching, it is very important to extract an edge of the image, e.g., extract an edge image from a grayscale image in FIG. 1, in an accurate and rapid manner.

SUMMARY

An object of the present disclosure is to provide an image edge extraction method, an image edge extraction device and an automated driving system, so as to extract the edge of the image in an accurate and rapid manner.

In one aspect, the present disclosure provides in some embodiments an image edge extraction method, including: acquiring a grayscale image of a target image; calculating an edge magnitude and an edge angle of the grayscale image, so as to generate an edge magnitude image and an edge angle image; detecting an edge peak of the edge magnitude image in accordance with the edge angle image, so as to acquire each edge point of the edge magnitude image and acquire an edge peak detection result; and performing double-thresholding segmentation on the edge peak detection result through a flooding method, so as to acquire an image edge of the target image.

In another aspect, the present disclosure provides in some embodiments an image edge extraction device, including: an acquisition module configured to acquire a grayscale image of a target image; a calculation module configured to calculate an edge magnitude and an edge angle of the grayscale image, so as to generate an edge magnitude image and an edge angle image; a detection module configured to detect an edge peak of the edge magnitude image in accordance with the edge angle image, so as to acquire each edge point of the edge magnitude image and acquire an edge peak detection result; and a segmentation module configured to perform double-thresholding segmentation on the edge peak detection result through a flooding method, so as to acquire an image edge of the target image.

In yet another aspect, the present disclosure provides in some embodiments an automated driving system including the above-mentioned image edge extraction device.

According to the embodiments of the present disclosure, both the edge magnitude and the edge angle are quantified so as to increase a segmentation speed of the image edge. The target image is represented by the grayscale image, the edge magnitude image and the edge angle image are indexed using a Lookup Table (LUT) in a rapid manner, the edge peak of an edge magnitude is detected through a neighborhood configuration method in accordance with the edge magnitude image and the edge angle image, and then the double-thresholding segmentation is performed on the edge peak detection result through the flooding method. As compared with an iteration method adopted in the related art, through the flooding method, it is able to achieve the edge segmentation of the image in a more efficient manner.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
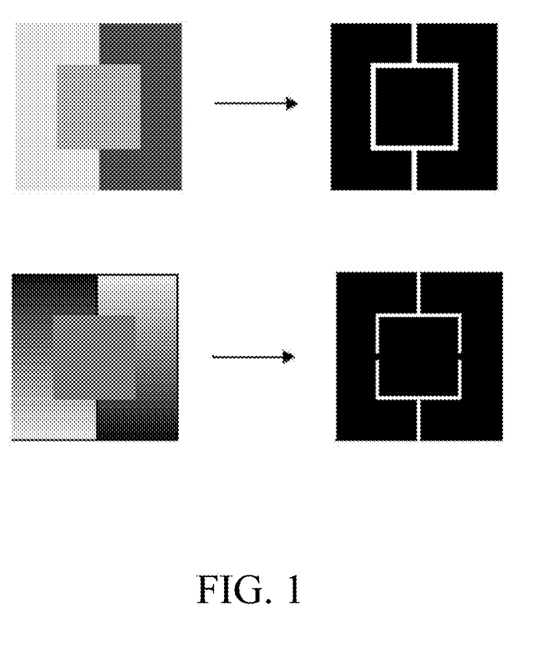
FIG. 1 is a schematic view showing grayscale images and edge images in the related art.
Figure 2:
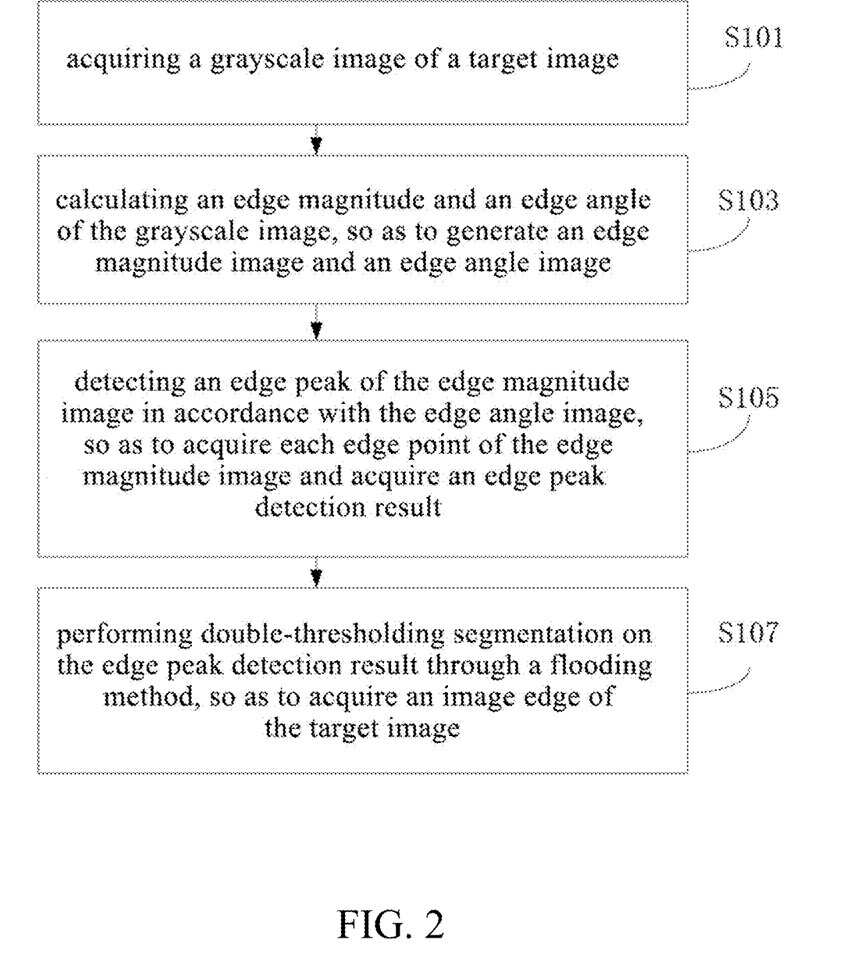
FIG. 2 is a flow chart of an image edge extraction method according to one embodiment of the present disclosure.

The present disclosure provides in some embodiments an image edge extraction method which, as shown in FIG. 1, includes: Step S101 of acquiring a grayscale image of a target image; Step S103 of calculating an edge magnitude and an edge angle of the grayscale image, so as to generate an edge magnitude image and an edge angle image; Step S105 of detecting an edge peak of the edge magnitude image in accordance with the edge angle image, so as to acquire each edge point of the edge magnitude image and acquire an edge peak detection result; and Step S107 of performing double-thresholding segmentation on the edge peak detection result through a flooding method, so as to acquire an image edge of the target image.

In Step S101, in order to acquire the grayscale image of the target image, at first it is necessary to represent the target image in the form of a grayscale image. To be specific, the edge magnitude and the edge angle may be calculated through a Sobel edge detection algorithm, and then the edge magnitude and the edge angle may each be represented in a 8-bit format, i.e., in the form of a grayscale image.

In Step S103, the edge magnitude and the edge angle of the grayscale image may be calculated, so as to generate the edge magnitude image and the edge angle image. In this step, it may take quite a long time to perform the extraction of a square root and an arc tangent operation during the calculation of the edge magnitude and the edge angle. In order to increase the calculation efficiency, an LUT may be adopted.

Figure 3:
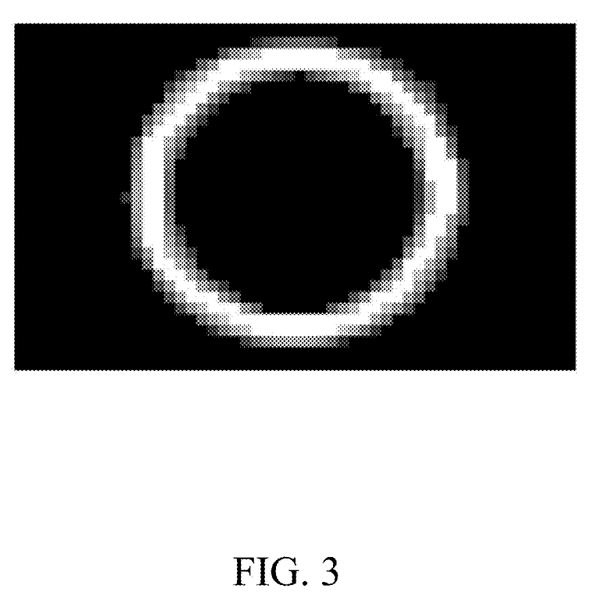
FIG. 3 is a partially schematic view showing a camera according to one embodiment of the present disclosure.

In Step S105, the edge peak of the edge magnitude image may be detected in accordance with the edge angle image, so as to acquire each edge point of the edge magnitude image, thereby to acquire the edge peak detection result. To be specific, usually the image edge is blurry to some extent, as shown in FIG. 3. Principally, this blue may be a shadow caused by illumination, or it may be caused by an imaging optical system or even an imaging object itself. Usually, the peak of the edge magnitude in an angle direction (i.e., an edge angle direction) corresponds to a real edge, and the other edges must be suppressed. The edge image peak detection is also called as non-maximal suppression. In the embodiments of the present disclosure, the edge angle may be divided into four different regions, and with respect to different regions, the peak detection may be performed using different neighborhood pixel configurations.

Figure 4:
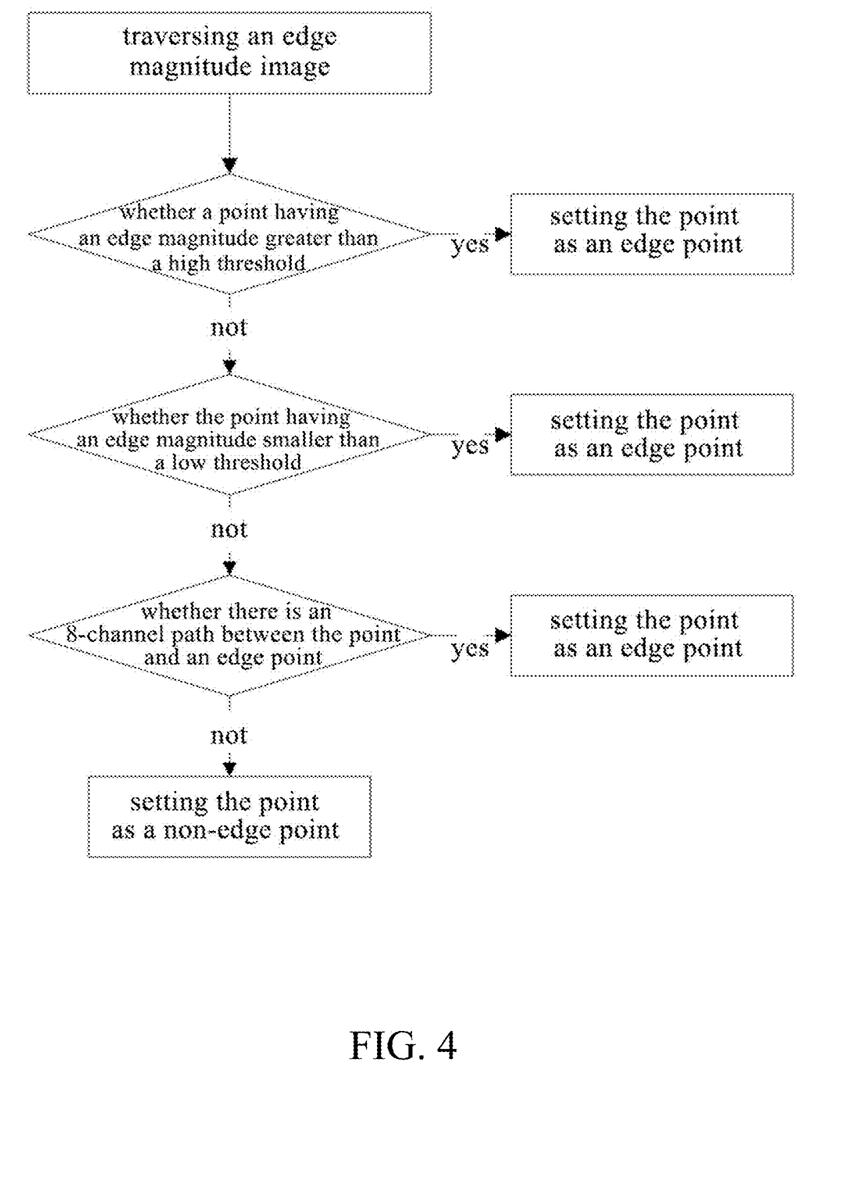
FIG. 4 is a schematic view showing a principle of a double-thresholding segmentation procedure according to one embodiment of the present disclosure.
Figure 5:
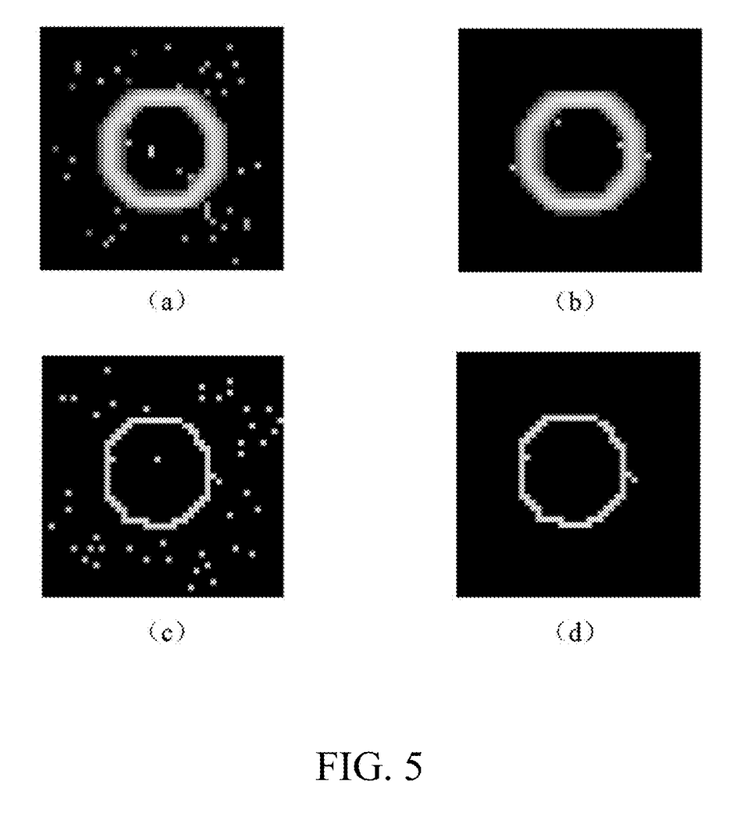
FIG. 5 is a schematic view showing images acquired through double-thresholding segmentation according to one embodiment of the present disclosure.

In Step S107, the double-thresholding segmentation may be performed on the edge peak detection result through the flooding method, so as to acquire the image edge of the target image. A principle of the double-thresholding segmentation will be described as follows (the flooding method is an extension on the basis of the principle of the double-thresholding segmentation). To be specific, for an actual image, the edge magnitude image includes a false or noisy edge point, which is called as a pseudo edge point. This pseudo edge point may be mainly caused by a noise of an image sensor and a defect of the imaging optical system. It is difficult to separate a real edge point from the pseudo edge point through a simple thresholding segmentation method. Usually, an edge of interest and several neighboring edges may form a set, and it is able to separate the edge of interest from the neighboring edges through hysteresis thresholding segmentation (i.e., the double-thresholding segmentation) in a better manner. FIG. 4 shows the principle of the double-thresholding segmentation, where a point having an edge magnitude larger than a high threshold is set as an edge point, and a point having an edge magnitude smaller than a low threshold is set as a non-edge point. For each point having an edge magnitude greater than the low threshold and smaller than the high threshold, when there is an eight-neighborhood edge point, this point may be set as an edge point, and otherwise, it may be set as a non-edge point. FIG. 5 shows the double-thresholding segmentation, where (a) presents an edge magnitude image, (b) represents an image acquired after the double-thresholding segmentation on (a), (c) represents an image of the peak detection result, and (d) represents an image acquired after the double-thresholding segmentation on (c). As shown in FIG. 5, through the double-thresholding segmentation, it is able to suppress the noise in a better manner, and when the double-thresholding segmentation is used in combination with the peak detection, it is able to detect the real edge effectively.

Figure 6:
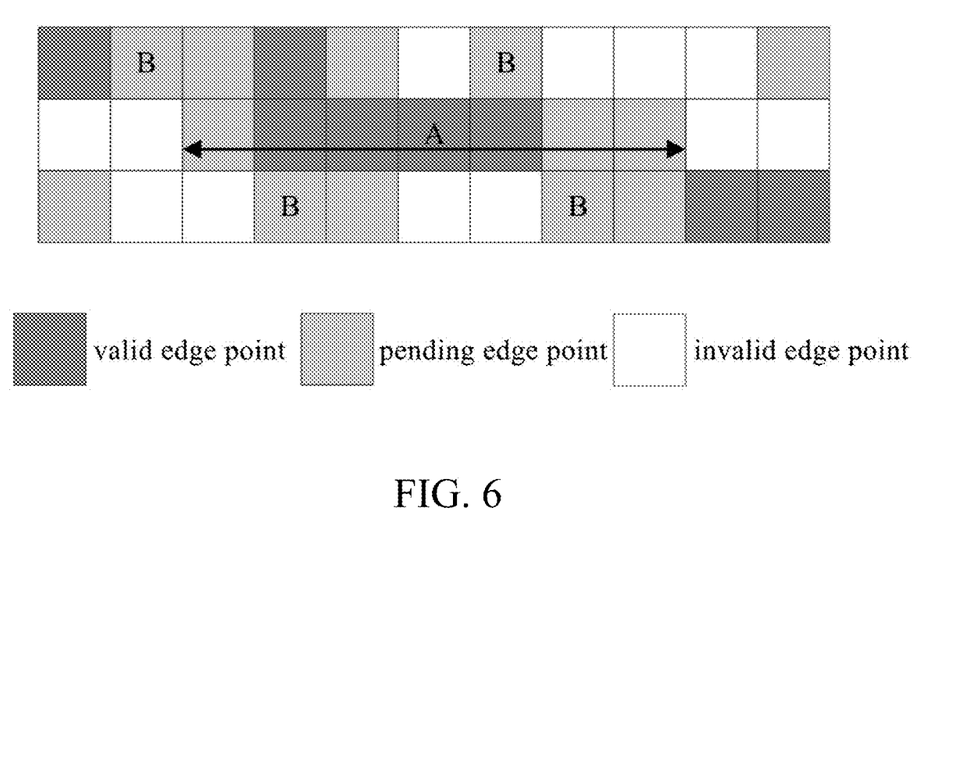
FIG. 6 is a schematic view showing a principle of edge connection when a flooding method is adopted according to one embodiment of the present disclosure.

FIG. 6 shows a principle of the flooding method. As a row extension method, its critical extension steps will be described as follows.

A. Row Treatment with an Initial Seed Point as a Center

With a valid edge point (i.e., the initial seed point A in FIG. 6) as a center, pixel points to the left and to the right of the initial speed point may be scanned until an invalid edge point occurs at each side, and non-invalid edge points (valid edge points or pending edge points) may be labeled as the valid edge points. Last non-invalid edge points at two sides may be recoded as x_right and x_left, and an interval between the two last non-invalid edge points may be called as a labeled run, e.g., pixels in a region covered by a line with two arrow heads in FIG. 6.

B. The labeled run may be extended to adjacent rows (a previous row and a next row), left−1 so as to acquire an extended interval from x_left−1 to x_right+1. The pixel points in the extended interval may be scanned from left to right, so as to determine the following two types of non-invalid edge points as secondary seed points (e.g., pixel point B in FIG. 6): (a) a first non-invalid edge point and (b) a non-invalid edge point with an adjacent valid edge point on the left. Then, these non-invalid edge points may be added into a stack.

In a word, both the edge magnitude and the edge angle are quantified so as to increase a segmentation speed of the image edge. The target image is represented by the grayscale image, the edge magnitude image and the edge angle image are indexed using the LUT in a rapid manner, the edge peak of an edge magnitude is detected through a neighborhood configuration method in accordance with the edge magnitude image and the edge angle image, and then the double thresholding segmentation is performed on the edge peak detection result through the flooding method. As compared with an iteration method adopted in the related art, through the flooding method, it is able to achieve the edge segmentation of the image in a more efficient manner.

In a possible embodiment of the present disclosure, the acquiring the grayscale image of the target image includes: performing Sobel edge detection calculation on the target image with a 3*3 neighborhood operator, so as to acquire the edge magnitude and the edge angle of the target image; and quantifying the edge magnitude and the edge angle, and multiplying each of the quantified edge magnitude and the quantified edge angle by a predetermined coefficient, so as to acquire grayscale images of the edge magnitude and the edge angle.

Figure 7:
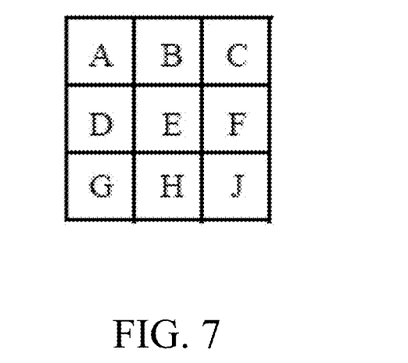
FIG. 7 is a schematic view showing a Sobel operator according to one embodiment of the present disclosure.

As shown in FIG. 7, a Sobel operator may be defined as a 3*3 neighborhood operator, the edge magnitudes in an x direction and in a y direction may be calculated through the following equations:

$$G_x = \frac{(C-A)+2(F-D)+(J-G)}{4} \text{ and}$$

$$G_x = \frac{(C-A)+2(F-D)+(J-G)}{4},$$

where A, B, C, D, E, F, G, H and J represent grayscale values of pixels at corresponding positions in the image respectively, and $G_x$ and $G_y$ represent an x-direction edge magnitude and a y-direction edge magnitude of a pixel at a central position (i.e., E) of the operator. At the central position, an edge magnitude S and an edge angle θ may be calculated through the following equations:

$$S = \sqrt{G_x^2 + G_y^2} \text{ and}$$

$$\theta = \tan^{-1}\left(\frac{G_y}{G_x}\right).$$

Figure 8:
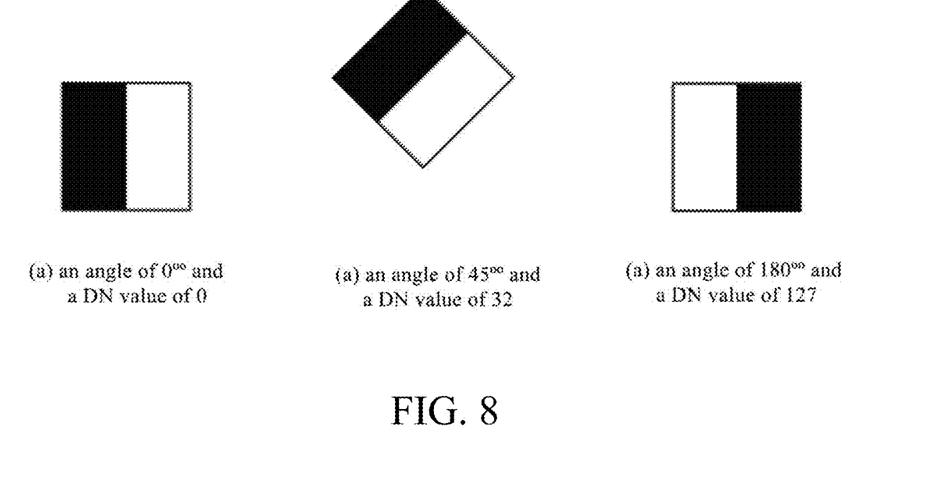
FIG. 8 is a schematic view showing edge angles and 8-bit quantified values according to one embodiment of the present disclosure.

FIG. 8 shows the edge angle images, where a DN value represents an 8-bit quantified value of each edge angle. During the digitalization, the edge magnitude and the edge angle may each be quantified and represented in the 8-bit quantified value. For each 8-bit image, the edge magnitude may be calculated as follows:

$$\begin{aligned} S &= \sqrt{G_x^2 + G_y^2} \\ &= \frac{1}{4}\sqrt{[(C-A)+2(F-D)+(J-G)]^2 + [(G-A)+2(H-B)+(J-C)]^2} \\ &= \frac{1}{4}\sqrt{[2(F-D)+(J-A)+(C-G)]^2 + [2(H-B)+(J-A)-(C-G)]^2} \\ &\leq \frac{1}{4}\sqrt{[2\times 255 + 255 + (C-G)]^2 + [2\times 255 + 255 - (C-G)]^2} \\ &= \frac{1}{4}\sqrt{[765+(C-G)]^2 + [765-(C-G)]^2} \\ &= \frac{1}{4}\sqrt{2\times 765^2 + 2(C-G)^2} \\ &\leq \frac{1}{4}\sqrt{2\times 765^2 + 2\times 255^2} \\ &\approx 286 \end{aligned}$$

The two inequality signs represent that a maximum grayscale difference is 255. A value domain of the edge magnitude is [0, 286], so each edge magnitude may be multiplied by a coefficient 0.89, so as to acquire the 8-bit edge magnitude image.

Figure 9:
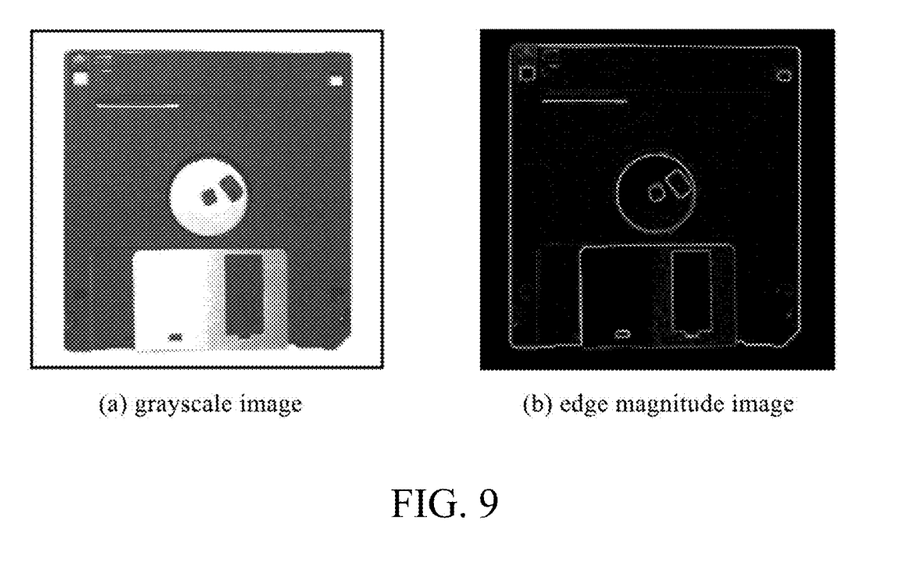
FIG. 9 is a schematic view showing an edge magnitude image according to one embodiment of the present disclosure.
Figure 10:
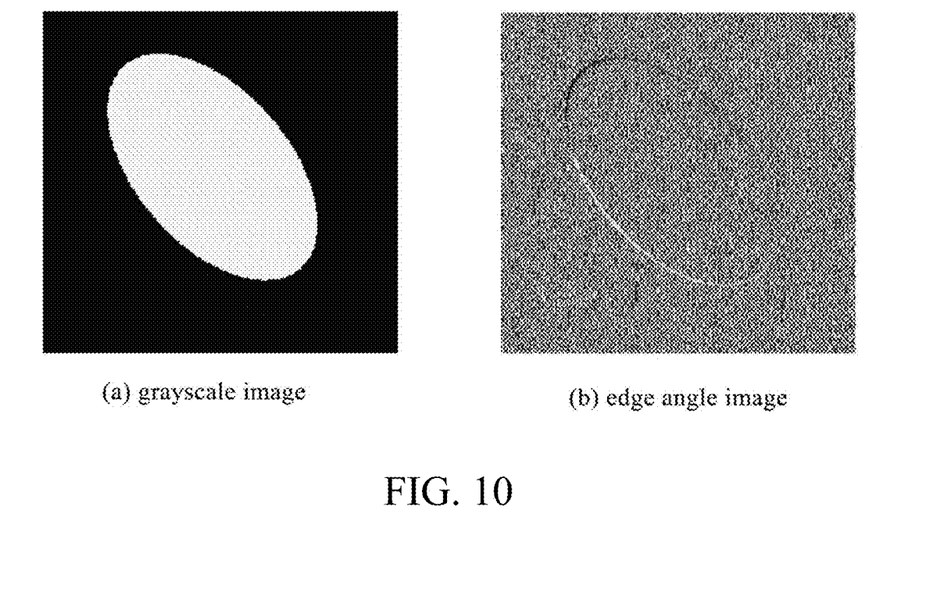
FIG. 10 is another schematic view showing the edge magnitude image according to one embodiment of the present disclosure.

A value domain of the edge angle is [0, 360], so each edge angle may be multiplied by a coefficient 0.708 so as to acquire the 8-bit edge angle image. FIG. 8 illustratively shows the 8-bit edge angles. After calculating the edge magnitude and the edge angle of the grayscale image, it is able to acquire the edge magnitude image and the edge angle image, as shown in FIGS. 9 and 10 respectively. In FIG. 10, for each point having a very small edge magnitude, its corresponding edge angle is a random value.

In a possible embodiment of the present disclosure, the calculating the edge magnitude and the edge angle of the grayscale image so as to generate the edge magnitude image and the edge angle image includes: creating the LUT for the edge magnitude and the edge angle; and calculating $G_x$ and $G_y$ of a pixel in a real-time image corresponding to the central position of the operator, and acquiring indices in the LUT in accordance with $G_x$ and $G_y$, so as to determine the edge magnitude and the edge angle of the pixel in the LUT. $G_x$ and $G_y$ represent an x-direction edge magnitude and a y-direction magnitude of the pixel in the real image corresponding to the central position of the operator.

Figure 11:
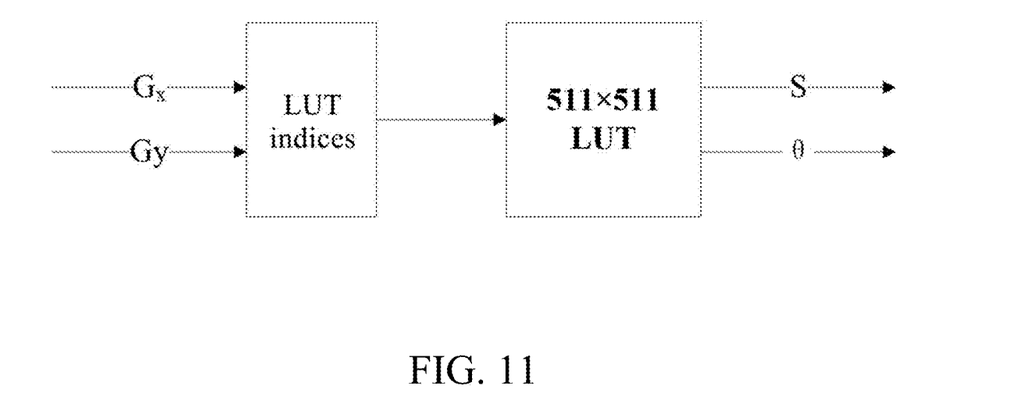
FIG. 11 is a schematic view showing an LUT calculation procedure of an edge magnitude and an edge angle according to one embodiment of the present disclosure.

To be specific, it may take quite a long time to perform the extraction of the square root and the arc tangent operation during the calculation of the edge magnitude and the edge angle. In order to increase the calculation efficiency, the LUT may be adopted, and FIG. 11 shows a calculation procedure. For an 8-bit grayscale image, $G_x$ and $G_y$ may be represented in a 9-bit form, where 8 bits are digital bits, and the remaining bit is a symbol bit. The indices in the LUT may be acquired in accordance with $G_x$ and $G_y$, and then the edge magnitude and the edge angle may be determined in the 511*511 LUT. A mapping relationship between $G_x$, $G_y$ and the indices $Id_x$, $Id_y$ may be expressed as:

$$\begin{cases} Id_x = G_x + 255 \\ Id_y = G_y + 255 \end{cases}.$$

Hence, mapping relationships between each of the edge magnitude S and the edge angle θ and the indices $Id_x$, $Id_y$ in the LUT may be expressed as follows:

$$S(Id_x, Id_y) = 0.89\sqrt{G_x^2 + G_y^2} = 0.89\sqrt{(Id_x - 255)^2 + (Id_y - 255)^2}, \text{ and}$$

$$\theta(Id_x, Id_y) = 0.708 \times \frac{180}{\pi} \tan^{-1}\left(\frac{G_y}{G_x}\right) = 40.565 \tan^{-1}\left(\frac{Id_y - 255}{Id_x - 255}\right).$$

The LUT for the edge magnitude and the edge angle may be created as mentioned above.

In a possible embodiment of the present disclosure, the detecting the edge peak of the edge magnitude image in accordance with the edge angle image so as to acquire each edge point of the edge magnitude image and acquire the edge peak detection result includes: dividing the edge angle into four regions in accordance with a predetermined rule; traversing the edge magnitude image and the edge angle image, and calculating a region where each edge point is located in accordance with the edge angle; performing neighborhood configuration on the edge point in accordance with the regions, so as to acquire two edge points adjacent to the edge point; and detecting peak values of the edge magnitudes of the edge point and the two adjacent edge points, so as to acquire the edge peak detection result.

The edge angle may be divided into four regions in accordance with the predetermined rule as follows. At first, the edge angle may be divided into four regions, i.e., a region 0 of 337.5° to 22.5° or 157.5° to 202.5°, a region 1 of 22.5° to 67.5° or 202.5° to 247.5°, a region 2 of 67.5° to 112.5° or 247.5° to 292.5°, and a region 3 of 112.5° to 157.5° or 292.5° to 337.5°.

Figure 12:
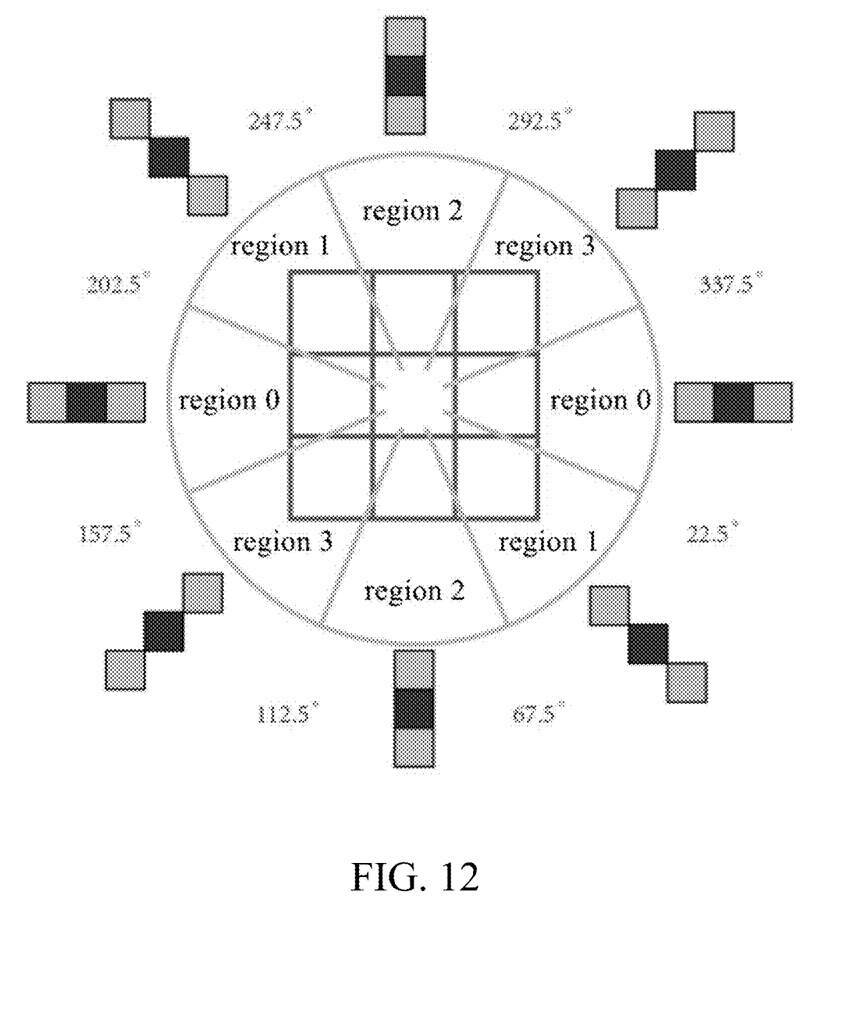
FIG. 12 is a schematic view showing neighborhood configuration for peak detection according to one embodiment of the present disclosure.

Then, the neighborhood configuration may be determined, and a number of a region where the edge point is located may be calculated in accordance with the edge angle through the following equation:

$$N = \text{Int}\left\{\frac{\theta + 22.5}{45}\right\} \% 4,$$

where $0° \leq \theta < 360°$, $\text{Int}\{\cdot\}$ represents a rounding operation, % represents a modulus operator, and N represents the region where the edge point is located. For the 8-bit edge angle image, the number of the region may be calculated through the following equation:

$$N = \text{Int}\left\{\frac{1.412\theta + 22.5}{45}\right\}\%4,$$

where $0° \leq \theta \leq 255°$, and N represents the region where the edge point is located, as shown in FIG. 12.

Figure 13:
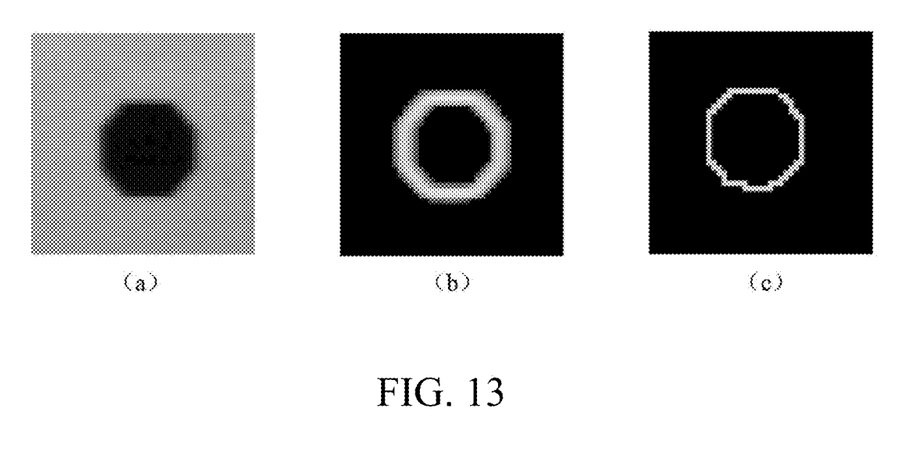
FIG. 13 is a schematic view showing the peak detection according to one embodiment of the present disclosure.

In a possible embodiment of the present disclosure, the detecting the peak values of the edge magnitudes of the edge point and the two adjacent edge points so as to acquire the edge peak detection result includes, when a current edge point is defined as the edge point having an edge magnitude of S and edge magnitudes of the two adjacent edge points are $S_1$ and $S_2$, determining whether S, $S_1$ and $S_2$ meet a predetermined condition, and when the predetermined condition is not met, setting the edge magnitude of the current edge point as 0. The predetermined condition includes $S > S_1$ and $S \geq S_2$. To be specific, when the edge magnitude of the current edge point is S, and the edge magnitudes of the two adjacent edge points are $S_1$ and $S_2$, FIG. 13 illustratively shows the peak detection, where (a) is the grayscale image, (b) is the edge magnitude image, and (c) is a peak image of the edge magnitudes. Before the peak detection, an edge width includes 4 or 5 pixels, and after the peak detection, the wedge width merely includes 1 or 2 pixels. Through the peak detection, it is able to differentiate the real edge from the other edges in a reliable manner.

In a possible embodiment of the present disclosure, the performing the double-thresholding segmentation on the edge peak detection result through the flooding method so as to acquire the image edge of the target image includes: Step 1 of traversing the edge magnitude image, and labeling the edge points in the edge peak detection result as the valid edge points, the pending edge points and the invalid edge points in accordance with a predetermined high threshold and a predetermined low threshold; Step 2 of taking one valid edge point as an initial seed point, scanning the edge points to the left and to the right of the initial seed point with the initial seed point as a center until an invalid edge point occurs at each side, taking all the valid edge points and the pending edge points as non-invalid edge points and labeling the non-invalid edge points as valid edge points, recording a position x_right of a first non-invalid edge point and a position x_left of a last non-invalid edge point, and taking an interval between the two non-invalid edge points as a labeled run; Step 3 of extending the labeled run to adjacent rows so as to acquire an extended interval from x_left−1 to x_right+1, scanning the edge points in the extended interval from left to right, adding the following two types of non-invalid edge points in the extended interval as secondary seed points into a stack for processing: (a) a first non-invalid edge point and (b) a non-invalid edge point with an adjacent valid edge point on the left, and traversing the secondary seed points, and repeating Steps 2 to 3 with each secondary seed point as the initial seed point until all the seed points in the stack has been treated; Step 4 of returning to Step 1, and treating a next valid edge point in the edge magnitude image until all the edge points in the edge magnitude image have been treated; and Step 5 of connecting the labeled valid edge points so as to acquire the image edge.

According to the embodiments of the present disclosure, both the edge magnitude and the edge angle are quantified so as to increase a segmentation speed of the image edge. The target image is represented by the grayscale image, the edge magnitude image and the edge angle image are indexed using the LUT in a rapid manner, the edge peak of the edge magnitude is detected through the neighborhood configuration method in accordance with the edge magnitude image and the edge angle image, and then the double thresholding segmentation is performed on the edge peak detection result through the flooding method. As compared with an iteration method adopted in the related art, through the flooding method, it is able to achieve the edge segmentation of the image in a more efficient manner.

Figure 14:
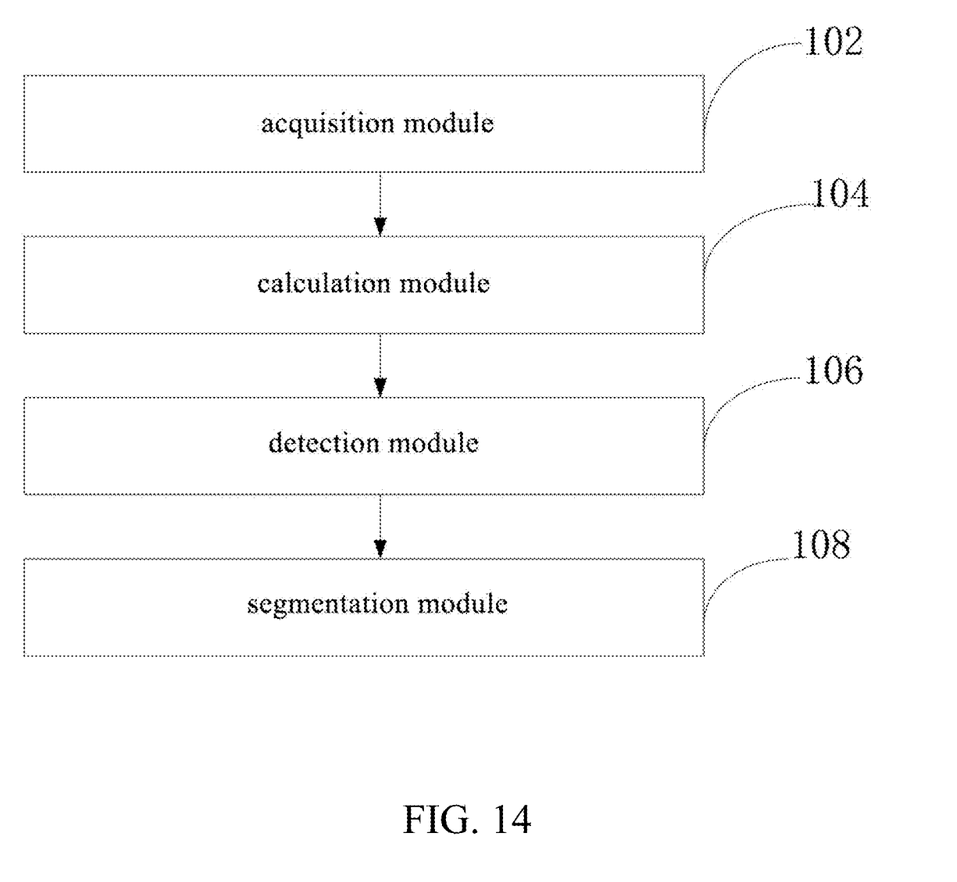
FIG. 14 is a schematic view showing an image edge extraction device according to one embodiment of the present disclosure.

The present disclosure further provides in some embodiments an image edge extraction device which, as shown in FIG. 14, includes: an acquisition module 102 configured to acquire a grayscale image of a target image; a calculation module 104 configured to calculate an edge magnitude and an edge angle of the grayscale image, so as to generate an edge magnitude image and an edge angle image; a detection module 106 configured to detect an edge peak of the edge magnitude image in accordance with the edge angle image, so as to acquire each edge point of the edge magnitude image and acquire an edge peak detection result; and a segmentation module 108 configured to perform double-thresholding segmentation on the edge peak detection result through a flooding method, so as to acquire an image edge of the target image.

In a possible embodiment of the present disclosure, the calculation module 104 includes: a creation module (not shown) configured to create an LUT for the edge magnitude and the edge angle; and a first calculation submodule configured to calculate $G_x$ and $G_y$ of a pixel in a real-time image corresponding to a central position of an operator, and acquire indices in the LUT in accordance with $G_x$ and $G_y$, so as to determine the edge magnitude and the edge angle of the pixel in the LUT. $G_x$ and $G_y$ represent an x-direction edge magnitude and a y-direction magnitude of the pixel in the real image corresponding to the central position of the operator.

In a possible embodiment of the present disclosure, the detection module 106 includes: a segmentation module (not shown) configured to divide the edge angle into four regions in accordance with a predetermined rule; a second calculation submodule (not shown) configured to traverse the edge magnitude image and the edge angle image, and calculate a region where each edge point is located in accordance with the edge angle; a configuration module (not shown) configured to perform neighborhood configuration on the edge point in accordance with the regions, so as to acquire two adjacent edge points corresponding to the edge point; and a detection submodule (not shown) configured to detect peak values of edge magnitudes of the edge points and the two adjacent edge points, so as to acquire the edge peak detection result.

In a possible embodiment of the present disclosure, the segmentation module 108 includes: a labeling module (not shown) configured to traverse the edge magnitude image, and label the edge points in the edge peak detection result as valid edge points, pending edge points and invalid edge points in accordance with a predetermined high threshold and a predetermined low threshold; an inquiry module (not shown) configured to take one valid edge point as an initial seed point, scan the edge points to the left and to the right of the initial seed point with the initial seed point as a center until an invalid edge point occurs at each side, take all the valid edge points and the pending edge points as non-invalid edge points and label the non-invalid edge points as valid edge points, record a position x_right of a first non-invalid edge point and a position x_left of a last non-invalid edge point, and take an interval between the two non-invalid edge points as a labeled run; a scanning module (not shown) configured to extend the labeled run to adjacent rows so as to acquire an extended interval from x_left−1 to x_right+1, scan the edge points in the extended interval from left to right, add the following two types of non-invalid edge points in the extended interval as secondary seed points into a stack for processing: (a) a first non-invalid edge point and (b) a non-invalid edge point with an adjacent valid edge point on the left, traverse the secondary seed points, take each secondary seed point as the initial seed point, and enable the inquiry module and the scanning module to be started again until all the seed points in the stack has been treated; and a returning execution module (not shown) configured to enable the labeling module so as to treat a next valid edge point in the edge magnitude image until all the edge points in the edge magnitude image have been treated.

The present disclosure further provides in some embodiments an automated driving system including the above-mentioned image edge extraction device. For example, the automated driving system includes a vehicle, e.g., an automobile, having the image edge extract device mounted on it. The vehicle can be a bus, a passenger car, or a truck. The automatic driving system of the automobile includes the image edge extraction device disclosed in this application, which is used to solve the problem of further processing the acquired image to ensure the image quality so as to guarantee the safety of automatic driving. The specific image edge extraction device and the corresponding image edge extraction method have been described in detail before, and are not described here.

According to the embodiments of the present disclosure, both the edge magnitude and the edge angle are quantified so as to increase a segmentation speed of the image edge. The target image is represented by the grayscale image, the edge magnitude image and the edge angle image are indexed using the LUT in a rapid manner, the edge peak of the edge magnitude is detected through the neighborhood configuration method in accordance with the edge magnitude image and the edge angle image, and then the double thresholding segmentation is performed on the edge peak detection result through the flooding method. As compared with an iteration method adopted in the related art, through the flooding method, it is able to achieve the edge segmentation of the image in a more efficient manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An image edge extraction method, comprising the steps of:
A: acquiring a grayscale image of a target image;
B: calculating an edge magnitude and an edge angle of the grayscale image to generate an edge magnitude image and an edge angle image;
C: detecting an edge peak of the edge magnitude image in accordance with the edge angle image to acquire a plurality of edge points of the edge magnitude image and obtain an edge peak detection result; and
D: performing double-thresholding segmentation on the edge peak detection result through a flooding method to acquire an image edge of the target image,
wherein Step C further comprises the sub-steps of:
dividing the edge angle into four regions according to a predetermined rule;
traversing the edge magnitude image and the edge angle image and, for a current edge point among the plurality of edge points, identifying the region in which the current edge point is located according to equation:

$$N = \text{Int}\left\{\frac{\theta + 22.5}{45}\right\}\%4,$$

wherein $0° \leq \theta < 360°$, $\text{Int}\{.\}$ represents a rounding operation, % represents a modulus operator, and N represents the region where the current edge point is located;
performing neighborhood configuration on the current edge point and acquire two edge points adjacent to the each edge point; and
detecting peak values of the edge magnitudes of the current edge point and the two adjacent edge points to acquire the edge peak detection result.

2. The image edge extraction method according to claim 1, wherein Step A comprises:
performing Sobel edge detection calculation on the target image with a 3*3 neighborhood operator to acquire the edge magnitude and the edge angle of the target image; and
quantifying the edge magnitude and the edge angle, and multiplying each of the quantified edge magnitude and the quantified edge angle by a predetermined coefficient, so as to acquire grayscale images of the edge magnitude and the edge angle.

3. The image edge extraction method according to claim 1, wherein Step B comprises:
creating a lookup table (LUT) for the edge magnitude and the edge angle;
calculating $G_x$ and $G_y$ of a pixel in a real-time image corresponding to a central position of an operator; and
acquiring indices in the LUT in accordance with $G_x$ and $G_y$ to determine the edge magnitude and the edge angle of the pixel in the LUT, wherein $G_x$ and $G_y$ respectively represent an x-direction edge magnitude and a y-direction magnitude of the pixel in the real image corresponding to the central position of the operator.

4. The image edge extraction method according to claim 1, wherein the four regions are region 0 of 337.5° to 22.5° or 157.5° to 202.5°, region 1 of 22.5° to 67.5° or 202.5° to 247.5°, region 2 of 67.5° to 112.5° or 247.5° to 292.5°, and region 3 of 112.5° to 157.5° or 292.5° to 337.5°.

5. The image edge extraction method according to claim 1, wherein the edge angle image is an 8-bit edge angle image, and $$N = \text{Int}\left\{\frac{1.412\theta + 22.5}{45}\right\}\%4,$$

wherein $0° \leq \theta \leq 255°$.

6. The image edge extraction method according to claim 1, wherein, in Step C, when the current edge point is defined as the edge point having an edge magnitude of S and edge magnitudes of the two adjacent edge points are $S_1$ and $S_2$ determining whether S, $S_1$ and $S_2$ meet a predetermined condition, and when the predetermined condition is not satisfied, setting the edge magnitude of the current edge point as 0, wherein the predetermined condition comprises $S > S_1$ and $S \geq S_2$.

7. The image edge extraction method according to claim 1, wherein Step D comprises the sub-steps of:
   1. traversing the edge magnitude image, and labeling edge points in the edge peak detection result as valid edge points, pending edge points, and invalid edge points in accordance with a predetermined high threshold and a predetermined low threshold;
   2. taking one valid edge point as an initial seed point, scanning the edge points to the left and to the right of the initial seed point with the initial seed point as a center until an invalid edge point occurs at each side, taking all the valid edge points and the pending edge points as non-invalid edge points, labeling the non-invalid edge points as valid edge points, recording a position x_right of a first non-invalid edge point and a position x_left of a last non-invalid edge point, and taking an interval between the two non-invalid edge points as a labeled run;
   3. extending the labeled run to adjacent rows to acquire an extended interval from x_left−1 to x_right+1, scanning the edge points in the extended interval from left to right, adding the following two types of non-invalid edge points in the extended interval as secondary seed points into a stack for processing: (a) a first non-invalid edge point and (b) a non-invalid edge point with an adjacent valid edge point on the left, and traversing the secondary seed points, and repeating sub-steps 2 and 3 with each secondary seed point as the initial seed point until all the seed points in the stack has been treated;
   4. returning to sub-step 1 to treat a next valid edge point in the edge magnitude image until all the edge points in the edge magnitude image have been treated; and
   5. connecting the labeled valid edge points to acquire the image edge.

8. An image edge extraction device, comprising:
   an acquisition module configured to acquire a grayscale image of a target image;
   a calculation module configured to calculate an edge magnitude and an edge angle of the grayscale image to generate an edge magnitude image and an edge angle image;
   a detection module configured to detect an edge peak of the edge magnitude image in accordance with the edge angle image to acquire each edge point of the edge magnitude image and acquire an edge peak detection result; and
   a segmentation module configured to perform double-thresholding segmentation on the edge peak detection result through a flooding method to acquire an image edge of the target image;
   wherein the division module comprises:
   a labeling module configured to traverse the edge magnitude image and label edge points in the edge peak detection result as valid edge points, pending edge points, and invalid edge points in accordance with a predetermined high threshold and a predetermined low threshold;
   an inquiry module configured to take one valid edge point as an initial seed point, scan the edge points to the left and to the right of the initial seed point with the initial seed point as a center until an invalid edge point occurs at each side, take all the valid edge points and the pending edge points as non-invalid edge points, label the non-invalid edge points as valid edge points, record a position x_right of a first non-invalid edge point and a position x_left of a last non-invalid edge point, and take an interval between the two non-invalid edge points as a labeled run;
   a scanning module configured to extend the labeled run to adjacent rows to acquire an extended interval from x_left−1 to x_right+1, scan the edge points in the extended interval from left to right, add the following two types of non-invalid edge points in the extended interval as secondary seed points into a stack for processing: (a) a first non-invalid edge point and (b) a non-invalid edge point with an adjacent valid edge point on the left, traverse the secondary seed points, take each secondary seed point as the initial seed point, and enable the inquiry module and the scanning module to be started again until all the seed points in the stack has been treated; and
   a returning execution module configured to enable the labeling module to treat a next valid edge point in the edge magnitude image until all the edge points in the edge magnitude image have been treated.

9. The image edge extraction device according to claim 8, wherein the calculation module comprises:
   a creation module configured to create an LUT for the edge magnitude and the edge angle; and
   a first calculation sub-module configured to calculate $G_x$ and $G_y$ of a pixel in a real-time image corresponding to a central position of an operator, and acquire indices in the LUT in accordance with $G_x$ and $G_y$, and to determine the edge magnitude and the edge angle of the pixel in the LUT, wherein $G_x$ and $G_y$ respectively represent an x-direction edge magnitude and a y-direction magnitude of the pixel in the real image corresponding to the central position of the operator.

10. The image edge extraction device according to claim 8, wherein the detection module comprises:
    a division module configured to divide the edge angle into four regions in accordance with a predetermined rule;
    a second calculation sub-module configured to traverse the edge magnitude image and the edge angle image, and to calculate a region where each edge point is located in accordance with the edge angle;
    a configuration module configured to perform neighborhood configuration on the edge point in accordance with the regions to acquire two edge points adjacent to the edge point; and
    a detection sub-module configured to detect peak values of the edge magnitudes of the edge point and the two adjacent edge points to acquire the edge peak detection result.

11. An automated driving system, comprising the image edge extraction device according to claim 8 mounted on a vehicle.

12. The automated driving system according to claim 11, wherein the calculation module in the image edge extraction device comprises:
    a creation module configured to create an LUT for the edge magnitude and the edge angle; and
    a first calculation sub-module configured to calculate $G_x$ and $G_y$ of a pixel in a real-time image corresponding to a central position of an operator, and acquire indices in the LUT in accordance with $G_x$ and $G_y$, and to determine the edge magnitude and the edge angle of the pixel in the LUT, wherein $G_x$ and $G_y$ respectively represent an x-direction edge magnitude and a y-direction magnitude of the pixel in the real image corresponding to the central position of the operator.

13. The automated driving system according to claim 11, wherein the detection module in the image edge extraction device comprises:
- a division module configured to divide the edge angle into four regions in accordance with a predetermined rule;
- a second calculation sub-module configured to traverse the edge magnitude image and the edge angle image, and calculate a region where each edge point is located in accordance with the edge angle;
- a configuration module configured to perform neighborhood configuration on the edge point in accordance with the regions to acquire two edge points adjacent to the edge point; and
- a detection sub-module configured to detect peak values of the edge magnitudes of the edge point and the two adjacent edge points to acquire the edge peak detection result.

* * * * *